United States Patent
Yamauchi et al.

(10) Patent No.: US 11,636,749 B2
(45) Date of Patent: Apr. 25, 2023

(54) DROWSINESS SIGN NOTIFICATION SYSTEM, DROWSINESS SIGN NOTIFICATION METHOD, AND DROWSINESS SIGN NOTIFICATION PROGRAM

(71) Applicant: TOYOTA JIDOSHA KABUSHIKI KAISHA, Toyota (JP)

(72) Inventors: Koichiro Yamauchi, Tokyo-to (JP); Shunichiroh Sawai, Tokyo-to (JP); Masataka Sano, Tokyo-to (JP); Takuya Sakata, Tokyo-to (JP); Hiromi Nemoto, Tokyo-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/351,406

(22) Filed: Jun. 18, 2021

(65) Prior Publication Data

US 2022/0005339 A1 Jan. 6, 2022

(30) Foreign Application Priority Data

Jul. 1, 2020 (JP) .............................. JP2020-114151

(51) Int. Cl.
*A61B 5/18* (2006.01)
*G08B 21/06* (2006.01)
(Continued)

(52) U.S. Cl.
CPC ............. *G08B 21/06* (2013.01); *B60W 40/08* (2013.01); *B60W 50/14* (2013.01);
(Continued)

(58) Field of Classification Search
USPC .................. 701/1, 470, 472, 517, 400, 300, 701/FOR. 000, FOR. 107, 2, 3, 19, 21,
(Continued)

(56) References Cited

U.S. PATENT DOCUMENTS 9,956,963 B2 * 5/2018 Vijaya Kumar ...... B60W 40/08
10,210,409 B1 * 2/2019 Migneco .............. G06V 20/593
(Continued)

FOREIGN PATENT DOCUMENTS

| JP | H 07-249197 A | 9/1995 |
| JP | 2007304705 A | 11/2007 |
| JP | 2016173651 A | 9/2016 |

*Primary Examiner* — Daniel Previl
(74) *Attorney, Agent, or Firm* — Dickinson Wright, PLLC (57) ABSTRACT

A drowsiness sign notification system applied to a vehicle includes a driver monitor and a controller. The driver monitor detects a driver state being a state of a driver of the vehicle. The controller executes a drowsiness sign determination process that determines whether or not the driver shows a drowsiness sign based on the driver state. When it is determined that the driver shows the drowsiness sign, the controller executes a first drowsiness sign notification process that gives a first drowsiness sign notice to the driver through display or vibration without using audio. When it is determined again that the driver shows the drowsiness sign after the first drowsiness sign notification process, the controller executes a second drowsiness sign notification process that gives a second drowsiness sign notice to the driver through audio.

10 Claims, 10 Drawing Sheets

(51) Int. Cl.
   *B60W 50/14*    (2020.01)
   *B60W 40/08*    (2012.01)
   *G08B 7/06*     (2006.01)
   *G06V 20/59*    (2022.01)

(52) U.S. Cl.
   CPC ............. *G06V 20/597* (2022.01); *G08B 7/06* (2013.01); *B60W 2540/229* (2020.02)

(58) Field of Classification Search
   USPC ........ 701/22, 23, 36, 50, 51, 67, 69, 70, 99, 701/116, 117, 120, 123, 124, 29.1, 408, 701/527, 528, 529, 530, 531, 532, 534, 701/537, 538, 540, 541, 533, 301, 302, 701/FOR. 100; 340/576, 575, 439, 566, 340/683, 686.1, 691.6, 692, 825.23, 340/825.24, 5.1; 705/2, 3, 80, 50, 1.1, 705/400, 500, 901, FOR. 000; 342/357.31, 386, 1, 5, 21, 13, 22, 24, 23, 342/25 R, 26 R, 27, 29, 36, 33, 41, 42; 348/78, 14.01, 21, 22, 24, 25, 31, 32, 35, 348/36, 40, 42, 61, 162, 169, 175, 173, 348/180, 177, 195, 206, 207.99, 377, 379; 375/240.18, 130, 211, 216, 218, 219, 224, 375/229, 237, 238, 239, 240, 242, 256, 375/257, 259, 286, 295, 316

See application file for complete search history.

(56) References Cited

U.S. PATENT DOCUMENTS

| | | | |
   |---|---|---|---|
   | 2011/0216181 A1* | 9/2011 | Yoda | A61B 5/18 348/78 |
   | 2018/0043901 A1* | 2/2018 | Kim | A61B 5/747 |
   | 2018/0284766 A1* | 10/2018 | Minegishi | G09B 19/167 |
   | 2019/0117144 A1* | 4/2019 | Carraro | A61B 5/02405 |

* cited by examiner

DROWSINESS SIGN NOTIFICATION SYSTEM, DROWSINESS SIGN NOTIFICATION METHOD, AND DROWSINESS SIGN NOTIFICATION PROGRAM

BACKGROUND

Technical Field

The present disclosure relates to a technique that notifies that a driver of a vehicle shows a drowsiness sign.

Background Art

Patent Literature 1 discloses a doze prevention device for a vehicle. The doze prevention device detects drowsiness of a driver. When the drowsiness of the driver is detected, the doze prevention device first outputs an audio guide (for example, "there is a sign of drowsiness"). If the drowsiness of the driver is still detected after the output of the audio guide, the doze prevention device turns on air conditioning of a seat on which the driver sits and further vibrates the seat.

Patent Literature 2 discloses a driver state improvement support device. When a driver state (e.g., drowsiness, tension, fatigue, and the like) becomes such a state that affects safe driving, the driver state improvement support device makes the driver have a conversation to improve the driver state.

LIST OF RELATED ART

Patent Literature 1: Japanese Laid-Open Patent Application Publication No. JP-2007-304705
Patent Literature 2: Japanese Laid-Open Patent Application Publication No. JP-2016-173651

SUMMARY

According to the technique disclosed in Patent Literature 1, when the drowsiness of the driver is detected, the audio guide is first output. In this case, not only the driver but also a fellow passenger can hear the audio guide. That is, although it is enough at an initial stage to give a notice to the driver, the notice reaches not only the driver but also the fellow passenger. Such the notification at the initial stage is annoying to the fellow passenger.

An object of the present disclosure to provide a technique that can notify that a driver shows a drowsiness sign while suppressing a fellow passenger's sense of annoyance.

A first aspect is directed to a drowsiness sign notification system applied to a vehicle.

The drowsiness sign notification system includes:
a driver monitor configured to detect a driver state being a state of a driver of the vehicle; and
a controller.

The controller is configured to execute:
a drowsiness sign determination process that determines whether or not the driver shows a drowsiness sign based on the driver state;
a first drowsiness sign notification process that gives a first drowsiness sign notice to the driver through display or vibration without using audio, when it is determined that the driver shows the drowsiness sign; and
a second drowsiness sign notification process that gives a second drowsiness sign notice to the driver through audio, when it is determined again that the driver shows the drowsiness sign after the first drowsiness sign notification process.

A second aspect is directed to a drowsiness sign notification method applied to a vehicle.

The vehicle has a driver monitor that detects a driver state being a state of a driver of the vehicle.

The drowsiness sign notification method includes:
a drowsiness sign determination process that determines whether or not the driver shows a drowsiness sign based on the driver state;
a first drowsiness sign notification process that gives a first drowsiness sign notice to the driver through display or vibration without using audio, when it is determined that the driver shows the drowsiness sign; and
a second drowsiness sign notification process that gives a second drowsiness sign notice to the driver through audio, when it is determined again that the driver shows the drowsiness sign after the first drowsiness sign notification process.

A third aspect is directed to a drowsiness sign notification program applied to a vehicle.

The vehicle has a driver monitor that detects a driver state being a state of a driver of the vehicle.

The drowsiness sign notification program, when executed by a computer, causes the computer to execute:
a drowsiness sign determination process that determines whether or not the driver shows a drowsiness sign based on the driver state;
a first drowsiness sign notification process that gives a first drowsiness sign notice to the driver through display or vibration without using audio, when it is determined that the driver shows the drowsiness sign; and
a second drowsiness sign notification process that gives a second drowsiness sign notice to the driver through audio, when it is determined again that the driver shows the drowsiness sign after the first drowsiness sign notification process.

According to the present disclosure, when it is determined that the driver of the vehicle shows the drowsiness sign, the drowsiness sign notice is given to the driver. It is thus possible to apply a stimulus to the driver and to keep an awake state of the driver. In other words, it is possible to prevent the driver from becoming an asleep state and to keep the driver at a state suitable for driving.

Especially, according to the present disclosure, the first drowsiness sign notice is first given to the driver not through audio but through display or vibration. Since the first drowsiness sign notice does not include audio, a fellow passenger does not notice the first drowsiness sign notice. Since the first drowsiness sign notice at an initial stage is unnoticed by the fellow passenger, the fellow passenger's sense of annoyance is suppressed.

When it is determined again that the driver shows the drowsiness sign after the first drowsiness sign notice, the second drowsiness sign notice is given to the driver through audio. The second drowsiness sign notice including the audio applies a stronger stimulus to the driver than in the case of the first drowsiness sign notice. As a result, it is possible to more surely keep the awake state of the driver.

EMBODIMENTS

Embodiments of the present disclosure will be described with reference to the accompanying drawings.

1. Outline

Figure 1:
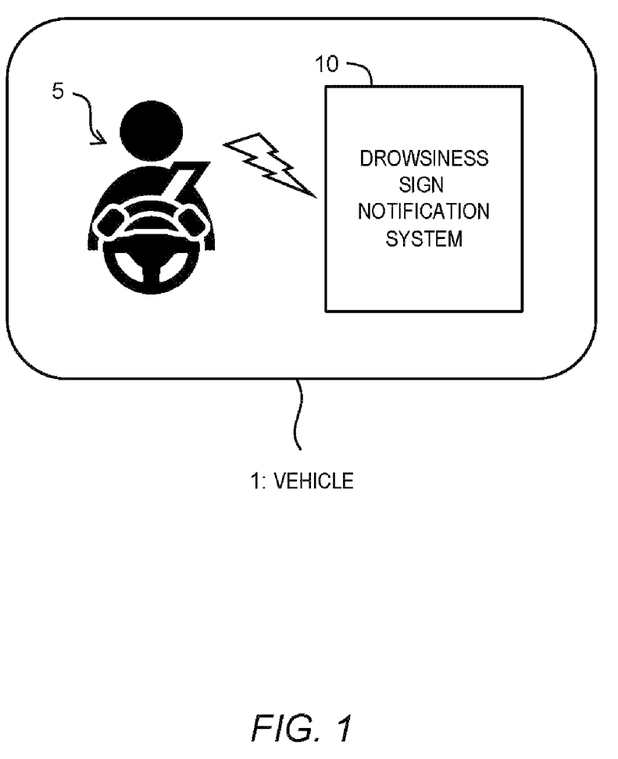
FIG. 1 is a conceptual diagram for explaining an outline of a drowsiness sign notification system according to an embodiment of the present disclosure.

FIG. 1 is a conceptual diagram for explaining an outline of a drowsiness sign notification system 10 according to the present embodiment. The drowsiness sign notification system 10 detects a "drowsiness sign" of a driver 5 of a vehicle 1. Here, the "drowsiness sign" means a state in which an awareness degree of the driver 5 is lowered before and after the driver 5 feels drowsiness. Typically, the drowsiness sign appears as a drowsiness action that is peculiar to the period before and after the driver 5 feels the drowsiness. Even if the driver 5 is not aware of the drowsiness, the drowsiness sign may be detected. In any case, it is before the driver 5 falls asleep that the drowsiness sign is detected.

More specifically, the drowsiness sign notification system 10 includes a driver monitor that detects a driver state that is a state of the driver 5. The drowsiness sign notification system 10 determines whether or not the driver 5 shows a drowsiness sign based on the driver state detected by the driver monitor. For example, the drowsiness sign notification system 10 determines, based on the driver state, whether or not there is a drowsiness action peculiar to the period before and after the driver 5 feels the drowsiness, thereby determining whether or not the driver 5 shows the drowsiness sign.

When it is determined that the driver 5 shows the drowsiness sign, that is, when the drowsiness sign is detected, the drowsiness sign notification system 10 notifies (feeds back) the detection of the drowsiness sign to the driver 5. The notice (feedback) is hereinafter referred to as a "drowsiness sign notice FB." The drowsiness sign notification system 10 gives the drowsiness sign notice FB to the driver 5 through display, audio, vibration, or the like. Such the drowsiness sign notice FB makes it possible to apply a stimulus to the driver 5 and to keep an awake state of the driver 5. In other words, the drowsiness sign notice FB makes it possible to prevent the driver 5 from becoming an asleep state and to keep the driver 5 at a state suitable for driving.

Figure 2:
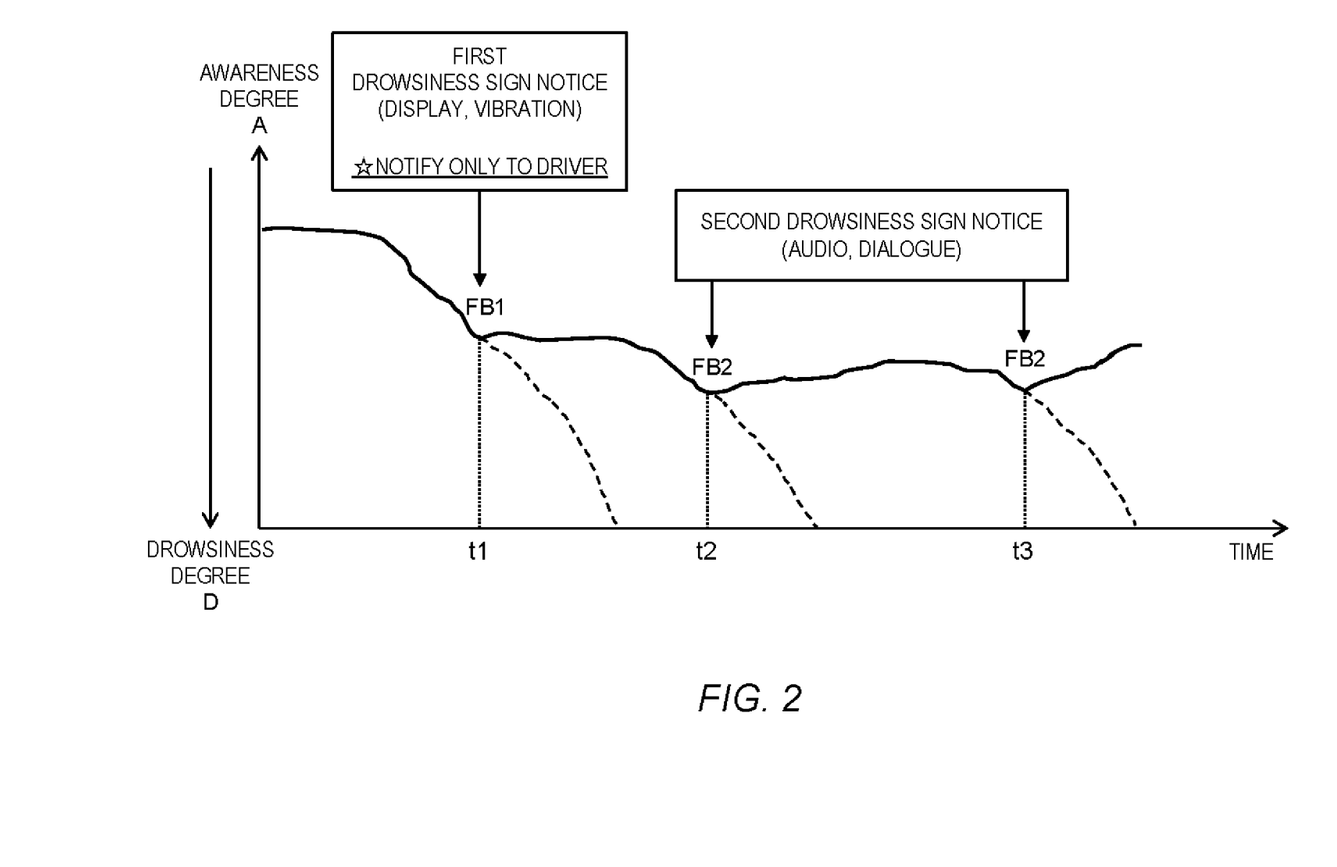
FIG. 2 is a timing chart for explaining an outline of the drowsiness sign notification system according to an embodiment of the present disclosure.

FIG. 2 is a timing chart for explaining an outline of the drowsiness sign notification system 10 according to the present embodiment. A horizontal axis represents time, and a vertical axis represents an awareness degree A and a drowsiness degree D of the driver 5. The awareness degree A and the drowsiness degree D are the two sides of the same coin, and the drowsiness degree D increases as the awareness degree A decreases. Calculating the awareness degree A and calculating the drowsiness degree D are equivalent to each other.

According to the present embodiment, the drowsiness sign notice FB includes two types, a "first drowsiness sign notice FB1" and a "second drowsiness sign notice FB2." The first drowsiness sign notice FB1 is used in a relatively early stage (initial stage) in which the awareness degree A is lowered. On the other hand, the second drowsiness sign notice FB2 is used after the first drowsiness sign notice FB1.

In the example shown in FIG. 2, the awareness degree A of the driver 5 gradually decreases and the drowsiness degree D gradually increases before a time t1. At the time t1, it is determined that the driver 5 shows a drowsiness sign. In response to that, the drowsiness sign notification system 10 gives the first drowsiness sign notice FB1 to the driver 5. The first drowsiness sign notice FB1 is given to the driver 5 not through audio but through display or vibration.

For example, the first drowsiness sign notice FB1 is a text message (e.g., "Are you sleepy?") displayed on a display placed in front of the driver 5. As another example, the first drowsiness sign notice FB1 may be blinking of a display or a luminescent device placed in front of the driver 5. As yet another example, the first drowsiness sign notice FB1 may be vibration of a seat belt worn by the driver 5.

Such the first drowsiness sign notice FB1 makes it possible to apply a stimulus to the driver 5 and to keep the awake state of the driver 5. Since the first drowsiness sign notice FB1 does not include audio, a fellow passenger in the vehicle 1 does not notice the first drowsiness sign notice FB1. That is, the first drowsiness sign notice FB1 is given through display or vibration so as to be noticed only by the driver. Since the first drowsiness sign notice FB1 at the initial stage is unnoticed by the fellow passenger, the fellow passenger's sense of annoyance is suppressed.

At a time t2 after the first drowsiness sign notice FB1, it is determined again that the driver 5 shows a drowsiness sign. In response to that, the drowsiness sign notification system 10 gives the second drowsiness sign notice FB2 to the driver 5. The second drowsiness sign notice FB2 is given to the driver 5 at least through audio.

For example, the second drowsiness sign notice FB2 is an audio message (e.g., "Are you sleepy?") output from a speaker. As another example, the second drowsiness sign notice FB2 may be a dialogue with the driver 5 (e.g., "There is a Shizuoka service area nearby. Do you want to stop by?"). As yet another example, the second drowsiness sign notice FB2 may be an alarm output from a speaker.

Such the second drowsiness sign notice FB2 makes it possible to apply a stimulus to the driver 5 and to keep the awake state of the driver 5. Especially, the second drowsiness sign notice FB2 including the audio applies a stronger stimulus to the driver 5 than in the case of the first drowsiness sign notice FB1. As a result, it is possible to more surely keep the awake state of the driver 5. When the second drowsiness sign notice FB2 is dialogic, it is expected that the awake state is further surely kept. It should be noted that when there is a fellow passenger in the vehicle 1, the fellow passenger also can hear the audio-based second drowsiness sign notice FB2. In this case, it is also expected that the fellow passenger talks to the driver 5 and keeps the driver 5 at the awake state.

The second drowsiness sign notice FB2 may be given repeatedly as necessary. In the example shown in FIG. 2, at a time t3 after the time t2, it is determined again that the driver 5 shows a drowsiness sign and the second drowsiness sign notice FB2 is given again. At this time, the second drowsiness sign notice FB2 different from the previous one may be given. Giving various types of the second drowsiness sign notice FB2 makes it possible to more surely keep the awake state of the driver 5.

Hereinafter, the drowsiness sign notification system 10 according to the present embodiment will be described in more detail.

2. Drowsiness Sign Notification System

2-1. Configuration Example

Figure 3:
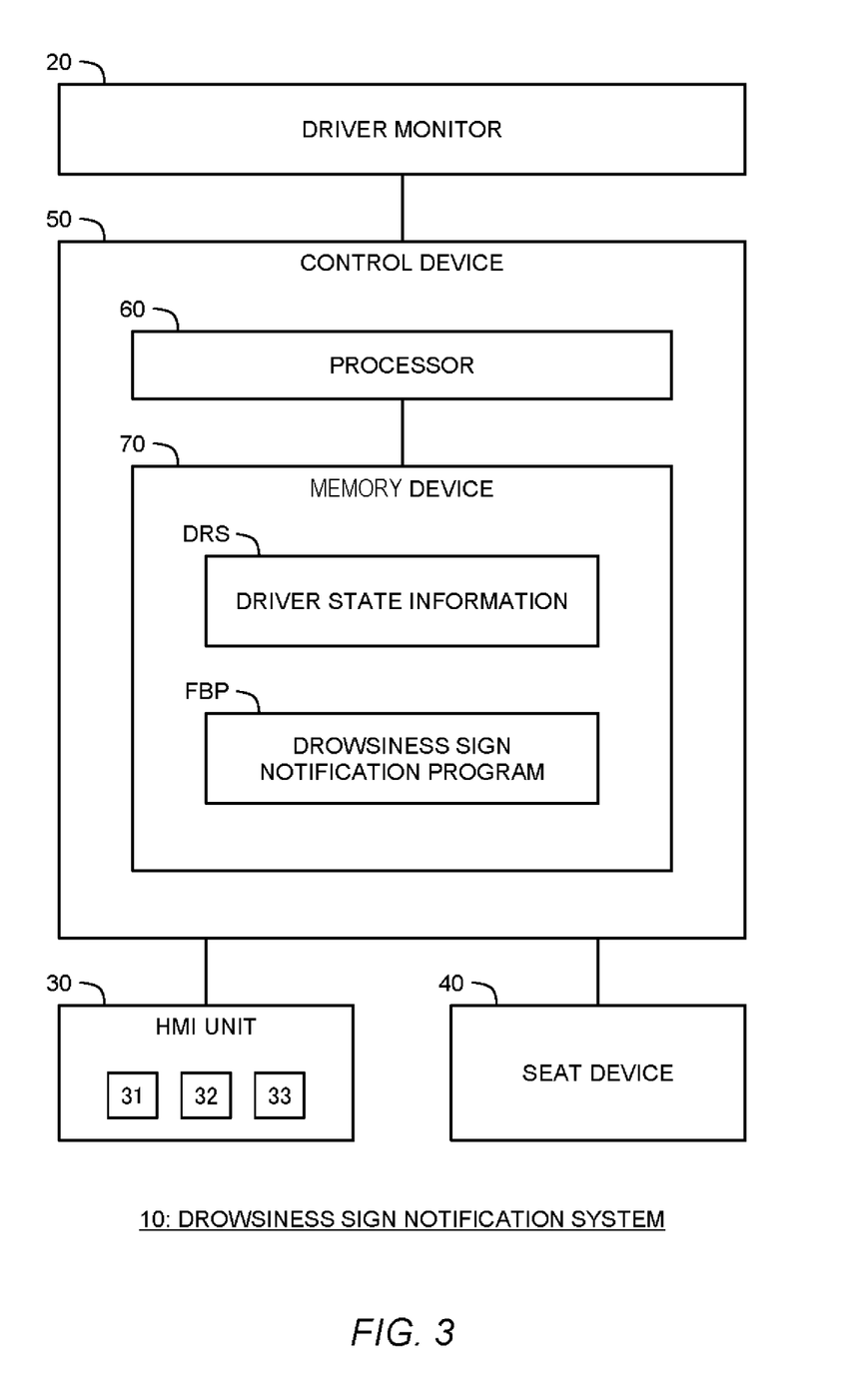
FIG. 3 is a block diagram showing a configuration example of the drowsiness sign notification system according to an embodiment of the present disclosure.

FIG. 3 is a block diagram showing a configuration example of the drowsiness sign notification system 10 according to the present embodiment. The drowsiness sign notification system 10 includes a driver monitor 20, an HMI (Human Machine Interface) unit 30, a seat device 40, and a control device (controller) 50.

The driver monitor 20 is installed on the vehicle 1 and detects a driver state which is a state of the driver 5. For example, the driver monitor 20 includes a camera that captures an image of the driver 5. Driver state information DRS indicates the driver state detected by the driver monitor 20. For example, the driver state information DRS indicates a degree of eye opening, a degree of mouth opening, a face orientation, a line of sight, and the like of the driver 5.

The HMI unit 30 is an interface that outputs information to the driver 5 and receives input of information from the driver 5. The HMI unit 30 includes a visual device 31, a speaker 32, and an input device 33

The visual device 31 is placed in front of the driver 5 and provides visual information to the driver 5. Examples of the visual device 31 include a display and a luminescent device. Examples of the display include a display (a liquid crystal display, an organic electroluminescent display, and the like) installed in an instrument panel, an HUD (Head-Up Display), and the like. Examples of the luminescent device include an LED (Light Emitting Diode).

The speaker 32 outputs audio. Examples of the input device 33 include a touch panel, a button, a microphone, and the like.

The seat device 40 is a device related to a seat on which the driver 5 sits. For example, the seat device 40 includes an actuator that vibrates a seat belt of the seat on which the driver 5 sits. As another example, the seat device 40 may have a refresh seat function that inflates an air bag installed in the seat to stimulate a back and a thigh of the driver 5.

The control device (controller) 50 is a computer that executes a variety of information processing. The control device 50 includes a processor 60 and a memory device 70. The processor 60 executes a variety of information processing. For example, the processor 60 includes a CPU (Central Processing Unit). The memory device 70 stores a variety of information. For example, the driver state information DRS acquired by the driver monitor 20 is stored in the memory device 70. Examples of the memory device 70 include a volatile memory, a nonvolatile memory, and the like.

A drowsiness sign notification program FBP is a computer program executed by a computer. The variety of information processing by the processor 60 (i.e., the control device 50) is achieved by the processor 60 executing the drowsiness sign notification program FBP. The drowsiness sign notification program FBP is stored in the memory device 70. The drowsiness sign notification program FBP may be recorded on a computer-readable recording medium. The drowsiness sign notification program FBP may be provided via a network.

It should be noted that the control device 50 may be an ECU (Electronic Control Unit) installed on the vehicle 1, or may be an information processing device outside the vehicle 1. In the latter case, the control device 50 communicates with the vehicle 1 to remotely execute the variety of information processing.

2-2. Drowsiness Sign Determination Process

The control device 50 executes "drowsiness sign determination process." In the drowsiness sign determination process, the control device 50 determines whether or not the driver 5 shows a drowsiness sign based on the driver state information DRS. Hereinafter, various examples of the drowsiness sign determination process will be described. However, a concrete method of the drowsiness sign determination process is not limited in particular.

2-2-1. First Example

Figure 4:
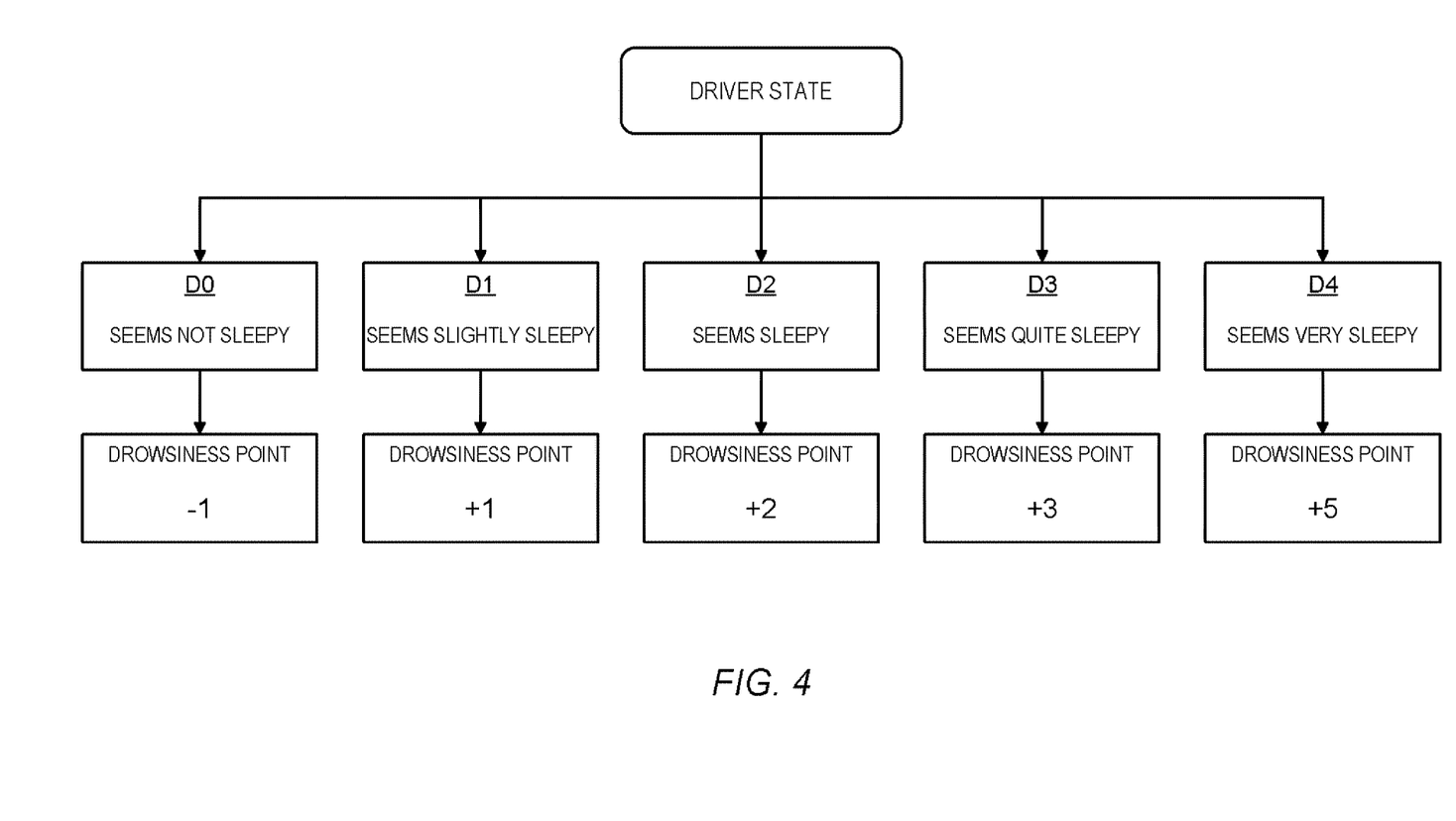
FIG. 4 is a conceptual diagram for explaining a first example of a drowsiness sign determination process according to an embodiment of the present disclosure.
Figure 5:
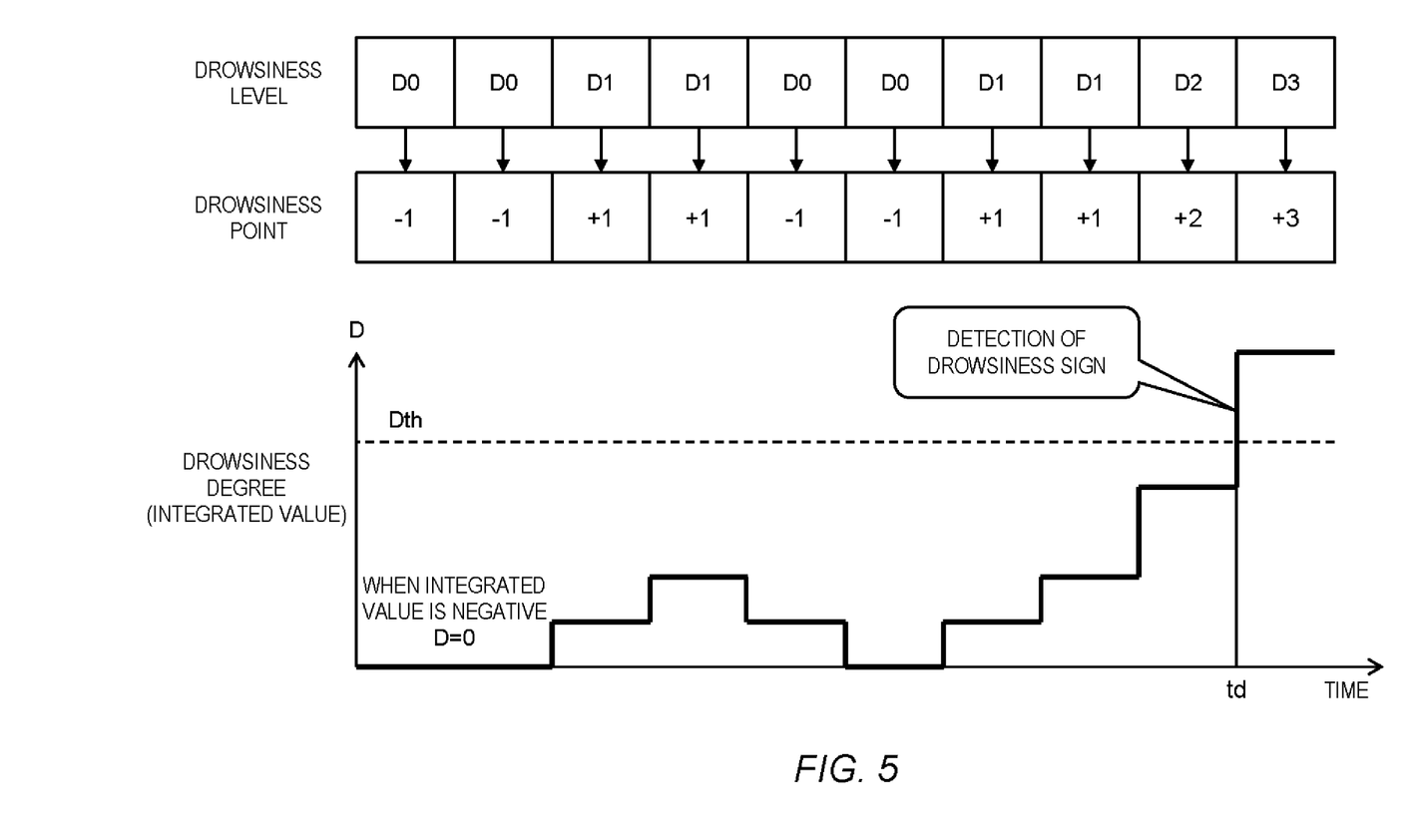
FIG. 5 is a conceptual diagram for explaining the first example of the drowsiness sign determination process according to an embodiment of the present disclosure.

FIGS. 4 and 5 are conceptual diagrams for explaining a first example of the drowsiness sign determination process. Typically, the drowsiness sign appears as a drowsiness action that is peculiar to the period before and after the driver 5 feels the drowsiness. In view of the above, in the first example, the driver state is classified (ranked) into a plurality of drowsiness levels from a viewpoint of the drowsiness action.

In the example shown in FIG. 4, the driver state is classified into five drowsiness levels D0 to D4. The drowsiness level D0 is the lowest, and the drowsiness level D4 is the highest. The higher the drowsiness level is, the stronger the drowsiness of the driver 5 is.

More specifically, the drowsiness level D0 corresponds to the driver state that seems not sleepy. Examples of the drowsiness action associated with the drowsiness level D0 include talking, checking a surrounding situation, and the like.

The drowsiness level D1 corresponds to the driver state that seems slightly sleepy. Examples of the drowsiness action associated with the drowsiness level D1 include decrease in blinking speed.

The drowsiness level D2 corresponds to the driver state that seems sleepy. Examples of the drowsiness action associated with the drowsiness level D2 include frequent blinking, head movement, and the like.

The drowsiness level D3 corresponds to the driver state that seems quite sleepy. Examples of the drowsiness action associated with the drowsiness level D3 include half-closed eyes, heavy eyelids, long yawn, and the like.

The drowsiness level D4 corresponds to the driver state that seems very sleepy. Examples of the drowsiness action associated with the drowsiness level D4 include closing eyelids and the like.

In this manner, the drowsiness action and each drowsiness level are associated with each other in advance. The control device 50 detects the drowsiness action based on the driver state information DRS (e.g., the degree of eye opening, the degree of mouth opening, and the like) acquired within a certain period of time (e.g., 10 seconds). Then, the control device 50 selects a drowsiness level associated with the detected drowsiness action.

Furthermore, as shown in FIG. 4, different drowsiness points are set for each drowsiness level. For example, the drowsiness point of the drowsiness level D0 is a negative value, and the drowsiness points of the drowsiness levels D1 to D4 are positive values. The drowsiness point increases as the drowsiness level becomes higher (as it goes from the D0 to the D4). The control device 50 converts the drowsiness level selected according to the drowsiness action into the drowsiness point. It should be noted that a correspondence relationship between the drowsiness level and the drowsiness point may vary depending on a situation.

In this manner, the control device 50 acquires the drowsiness point depending on the driver state every certain period of time (e.g., 10 seconds). Then, as shown in FIG. 5, the control device 50 integrates the drowsiness points. The integrated value of the drowsiness points is used as the "drowsiness degree D." That is, the control device 50 calculates the integrated value of the drowsiness points as the drowsiness degree D. It should be noted that when the integrated value is a negative value, the drowsiness degree D is set to 0.

Then, the control device 50 compares the drowsiness degree D with a threshold Dth. When the drowsiness degree D exceeds the threshold Dth, the control device 50 determines that the driver 5 shows the drowsiness sign. In the example shown in FIG. 5, it is determined at a time td that the driver 5 shows the drowsiness sign.

2-2-2. Second Example

Figure 6:
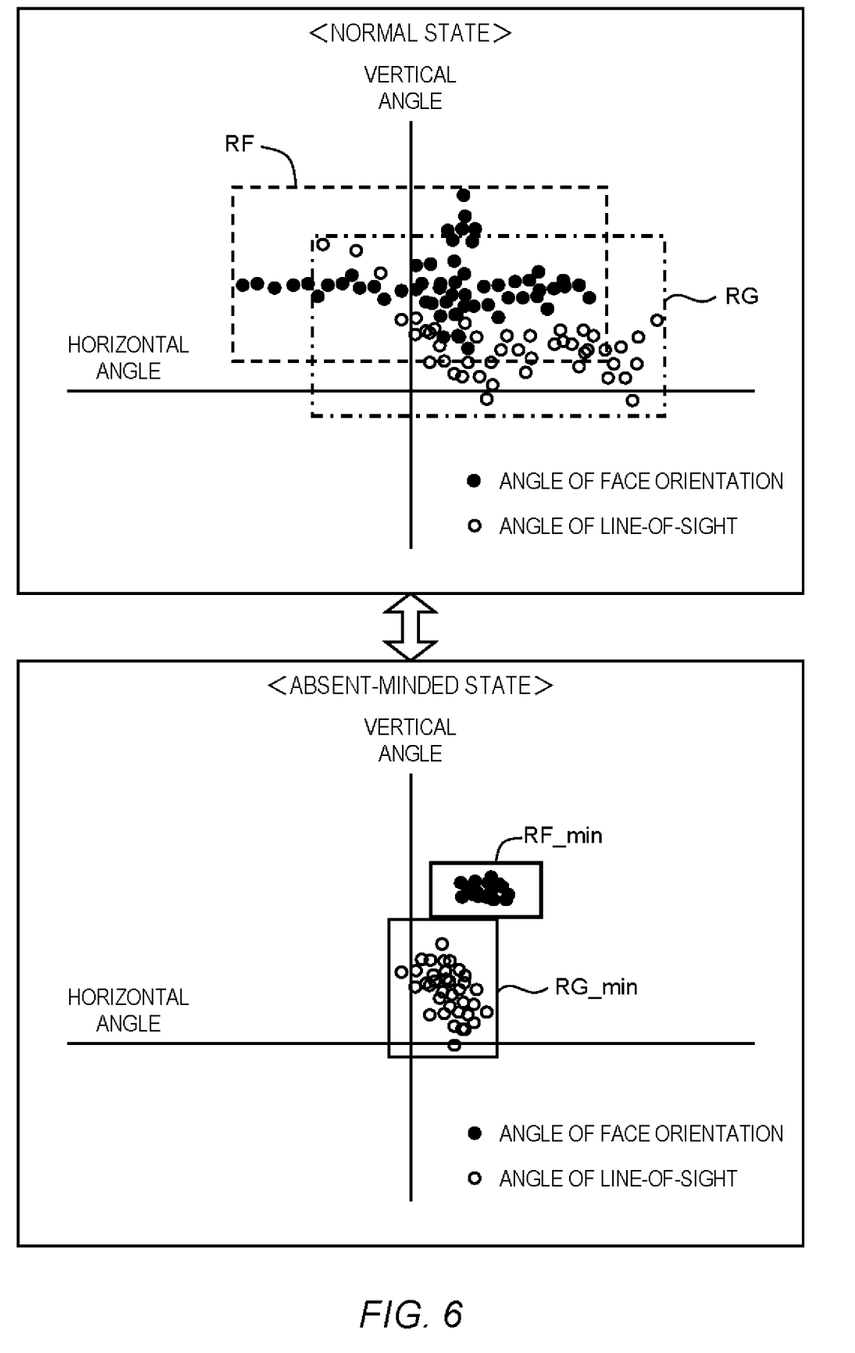
FIG. 6 is a conceptual diagram for explaining a second example of a drowsiness sign determination process according to an embodiment of the present disclosure.

FIG. 6 is a conceptual diagram for explaining a second example of the drowsiness sign determination process. In the second example, an absent-minded state of the driver 5 is detected as the drowsiness sign.

In FIG. 6, distributions of an angle of face orientation and an angle of line-of-sight of the driver 5 in a certain period of time (e.g., 30 seconds) are shown. In a case of a normal state, the angle of face orientation and the angle of line-of-sight of the driver 5 vary over a wide range. In other words, a variation range RF of the angle of face orientation and a variation range RG of the angle of line-of-sight are relatively wide. However, when the driver 5 becomes absent-minded, the variation ranges RF and RG tend to become narrower. When the variation ranges RF and RG respectively fall within predetermined ranges RF_min and RG_min, the driver 5 is considered to be in the absent-minded state.

In view of the above, the control device 50 acquires, every certain time period (e.g., 30 seconds), the variation ranges RF and RG based on the driver state information DRS (i.e., the face orientation, the line of sight, and the like) acquired within the certain time period. When the variation ranges RF and RG respectively fall within the predetermined ranges RF_min and RG_min, the control device 50 determines that the driver 5 shows the drowsiness sign.

2-2-3. Third Example

It is also possible to appropriately combine the first example and the second example. For example, when any of a first determination condition in the first example and a second determination condition in the second example is satisfied, it is determined that the driver 5 shows the drowsiness sign. As another example, the absent-minded state of the driver 5 is quantified and then added to the drowsiness degree D.

2-3. Drowsiness Sign Notification Process

When it is determined in the drowsiness sign determination process that the driver 5 shows the drowsiness sign, the control device 50 executes a "drowsiness sign notification process." In the drowsiness sign notification process, the control device 50 gives the drowsiness sign notice FB to the driver 5. The drowsiness sign notification process includes a "first drowsiness sign notification process" and a "second drowsiness sign notification process" described below.

2-3-1. First Drowsiness Sign Notification Process

In the first drowsiness sign notification process, the control device 50 gives the "first drowsiness sign notice FB1" to the driver 5 through display or vibration without using audio. The first drowsiness sign notice FB1 continues, for example, for a few seconds to a few tens of seconds.

For example, the first drowsiness sign notice FB1 is a text message (e.g., "Are you sleepy?") displayed on a display. In this case, the control device 50 displays the text message on the visual device 31 (display).

As another example, the first drowsiness sign notice FB1 may be blinking of a display or a luminescent device. In this case, the control device 50 make the visual device 31 (display, luminescent device) blinking.

As yet another example, the first drowsiness sign notice FB1 may be vibration of a seat belt worn by the driver 5. In this case, the control device 50 controls the seat device 40 to vibrate the seat belt.

The first drowsiness sign notice FB1 may be a combination of two or more of the plurality of examples described above.

2-3-2. Second Drowsiness Sign Notification Process

In the second drowsiness sign notification process, the control device 50 gives the "second drowsiness sign notice FB2" to the driver 5 at least through audio. The audio is output from the speaker 32.

For example, the second drowsiness sign notice FB2 is an audio message (e.g., "Are you sleepy?"). In this case, the control device 50 outputs the audio message from the speaker 32.

As another example, the second drowsiness sign notice FB2 may be a dialogue with the driver 5. In this case, the control device 50 performs a "dialogue process" that conducts a dialogue with the driver 5 through the audio. For example, the control device 50 outputs a suggestion message (e.g., "There is a Shizuoka service area nearby. Do you want to stop by?", "Do you want to use a refresh seat?) to the driver 5 from the speaker 32. At the same time, the control device 50 may display the suggestion message on the visual device 31 (display). The driver 5 returns an answer (Yes/No) to the suggestion message. The control device 50 acquires voice of the driver 5 through the input device 33 (microphone) and recognizes the answer of the driver 5 by performing speech recognition processing. In a case where the driver 5 accepts the suggestion, the control device 50 executes processing accordingly (e.g., setting a destination, turning on the refresh seat function of the seat device 40, and the like). Due to the dialogue process, it is expected that the driver 5 does at least not get sleepier. In other words, due to the dialogue process, it is expected that at least the current awake state is maintained. Such the dialogue performed in the second drowsiness sign notification process can also be called "awakening dialogue", "navigation dialogue", or "agent dialogue."

As yet another example, the second drowsiness sign notice FB2 may be an alarm. In this case, the control device 50 outputs the alarm from the speaker 32.

The second drowsiness sign notice FB2 may be a combination of two or more of the plurality of examples described above.

3. Example of Processing by Drowsiness Sign Notification System

Figure 7:
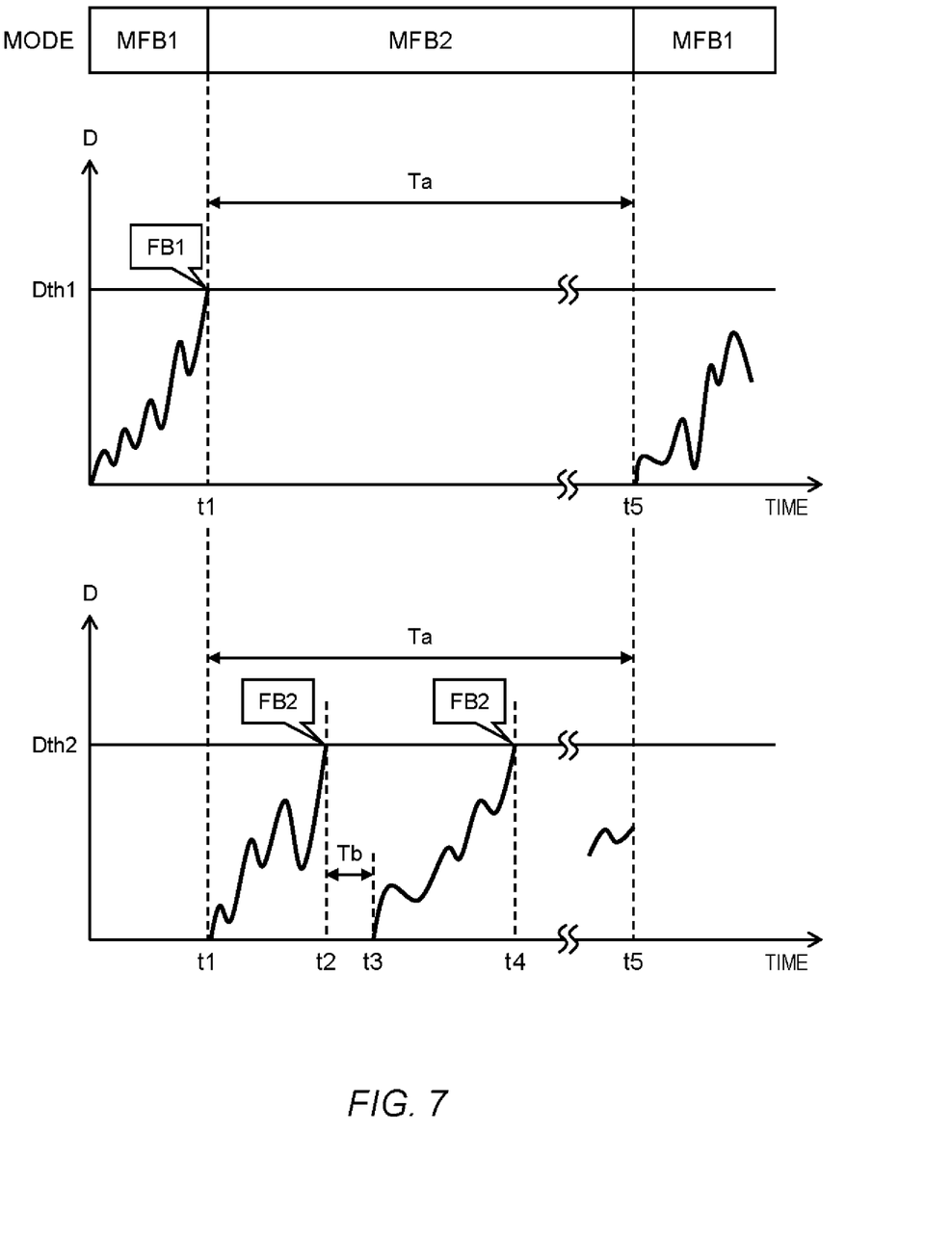
FIG. 7 is a timing chart showing an example of processing by the drowsiness sign notification system according to an embodiment of the present disclosure.

FIG. 7 is a timing chart showing an example of processing by the drowsiness sign notification system 10 (the control device 50) according to the present embodiment. A horizontal axis represents time, and a vertical axis represents the drowsiness degree D.

In the example shown in FIG. 7, operation modes of the control device 50 include two modes, a "first feedback mode MFB1" and a "second feedback mode MFB2." The control device 50 switches the operation mode as appropriate. An initial operation mode is the first feedback mode MFB1.

In the first feedback mode MFB1, the control device 50 calculates the drowsiness degree D based on the driver state information DRS and performs the drowsiness sign determination process. At a time t1, the drowsiness degree D exceeds a first threshold Dth1. In response to that, the control device 50 executes the first drowsiness sign notification process described above to give the first drowsiness sign notice FB1. In addition, the control device 50 resets the drowsiness degree D. In addition, the control device 50 resets the drowsiness degree D. Then, the control device 50 switches the operation mode from the first feedback mode MFB1 to the second feedback mode MFB2.

In the second feedback mode MFB2, the control device 50 calculates the drowsiness degree D based on the driver state information DRS and performs the drowsiness sign determination process. At a time t2, the drowsiness degree D exceeds a second threshold Dth2. In response to that, the control device 50 executes the second drowsiness sign notification process described above to give the second drowsiness sign notice FB2. In addition, the control device 50 resets the drowsiness degree D.

At a time t3 after an elapse of a predetermine period Tb (e.g., 3 minutes) since the time t2, the control device 50 resumes calculation of the drowsiness degree D. At a time t4, the drowsiness degree D exceeds the second threshold Dth2 again. In response to that, the control device 50 executes the above-described second drowsiness sign notification process again to give the second drowsiness sign notice FB2 again. Contents of the second drowsiness sign notice FB2 at the time t4 may be different from those at the previous time t2. Giving various kinds of the second drowsiness sign notice FB2 makes it possible to further surely keep the awake state of the driver 5.

A time t5 is a time after an elapse of a predetermine period Ta (e.g., 20 minutes) since the operation mode is switched from the first feedback mode MFB1 to the second feedback mode MFB2. At the time t5, the control device 50 switches the operation mode from the second feedback mode MFB2 to the first feedback mode MFB1. As a result, it is suppressed that the second drowsiness sign notification process is unnecessarily repeated after the awareness degree A of the driver 5 recovers to some extent.

Preparing the first feedback mode MFB1 and the second feedback mode MFB2 as described above makes it possible to flexibly design the drowsiness sign notification process. For example, the second drowsiness sign notification process in the second feedback mode MFB2 may be designed to be activated more easily than the first drowsiness sign notification process in the first feedback mode MFB1. In other words, the second drowsiness sign notification process may be designed to have a higher sensitivity than the first drowsiness sign notification process.

For example, the second threshold Dth2 used in the second feedback mode MFB2 is set to be lower than the first threshold Dth1 used in the first feedback mode MFB1.

As another example, the drowsiness points (see FIGS. 4 and 5) used in the second feedback mode MFB2 are set to be larger than the drowsiness points used in the first feedback mode MFB1. In this case, the first threshold Dth1 and the second threshold Dth2 may be equal to each other.

Since the second drowsiness sign notification process is activated more easily than the first drowsiness sign notification process, it is possible to promote awakening of the driver 5 more quickly when the awareness degree A of the driver 5 is long in recovering.

Figure 8:
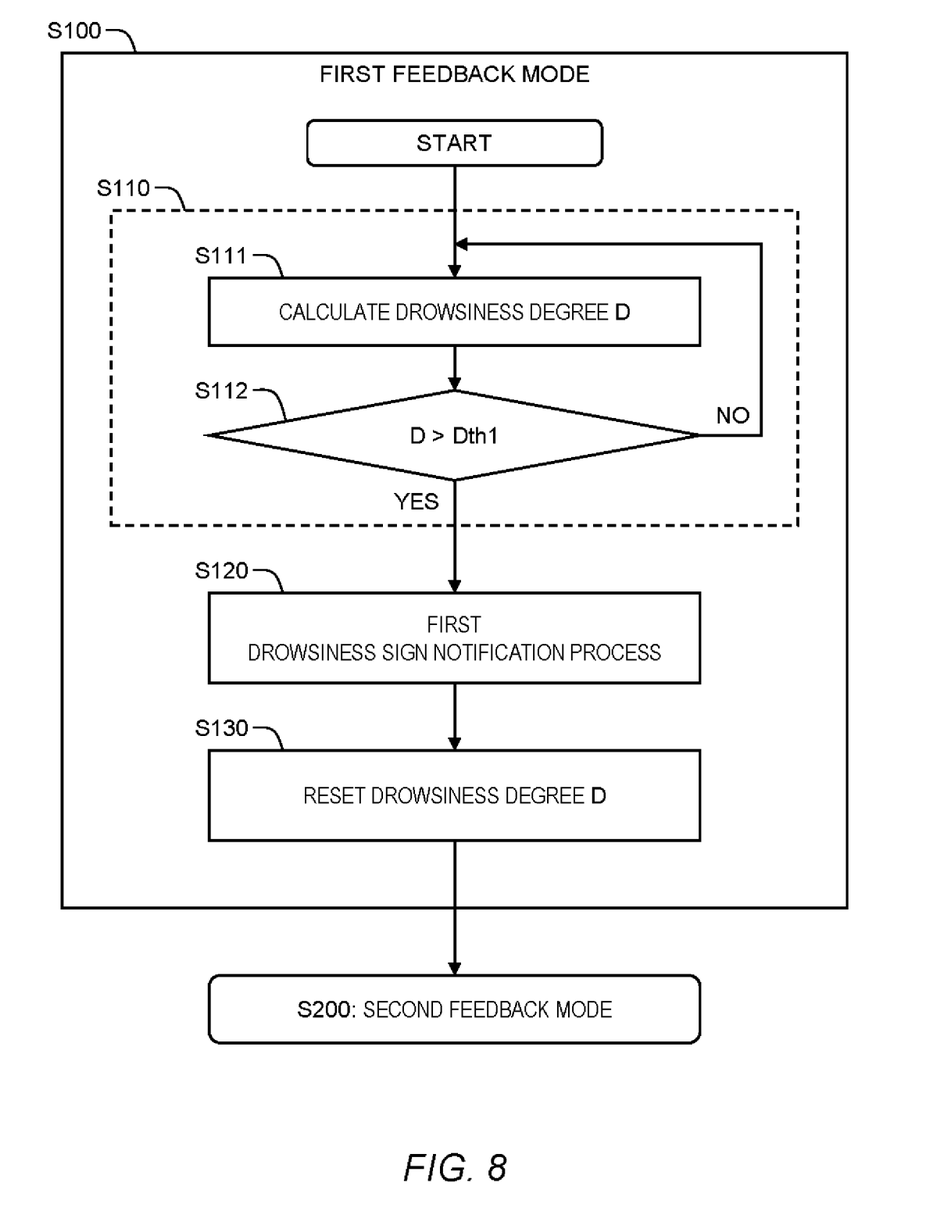
FIG. 8 is a flow chart showing in a summarized manner the processing in a first feedback mode by the drowsiness sign notification system according to an embodiment of the present disclosure.

FIG. 8 is a flow chart showing in a summarized manner the processing in the first feedback mode MFB1 according to the present embodiment. In Step S100, the control device 50 operates in the first feedback mode MFB1.

More specifically, in Step S110, the control device 50 executes the drowsiness sign determination process that determines whether or not the driver 5 shows a drowsiness sign based on the driver state information DRS. For example, the control device 50 calculates the drowsiness degree D of the driver 5 based on the driver state information DRS (Step S111). When the drowsiness degree D is equal to or less than the first threshold Dth1 (Step S112; No), the processing returns back to Step S111. When the drowsiness degree D exceeds the first threshold Dth1 (Step S112; Yes), the control device 50 determines that the driver 5 shows the drowsiness sign. Then, the processing proceeds to Step S120.

In Step S120, the control device 50 executes the first drowsiness sign notification process to give the first drowsiness sign notice FB1 to the driver 5.

In Step S130, the control device 50 resets the drowsiness degree D.

Then, the control device 50 switches the operation mode from the first feedback mode MFB1 to the second feedback mode MFB2. The processing proceeds to Step S200.

Figure 9:
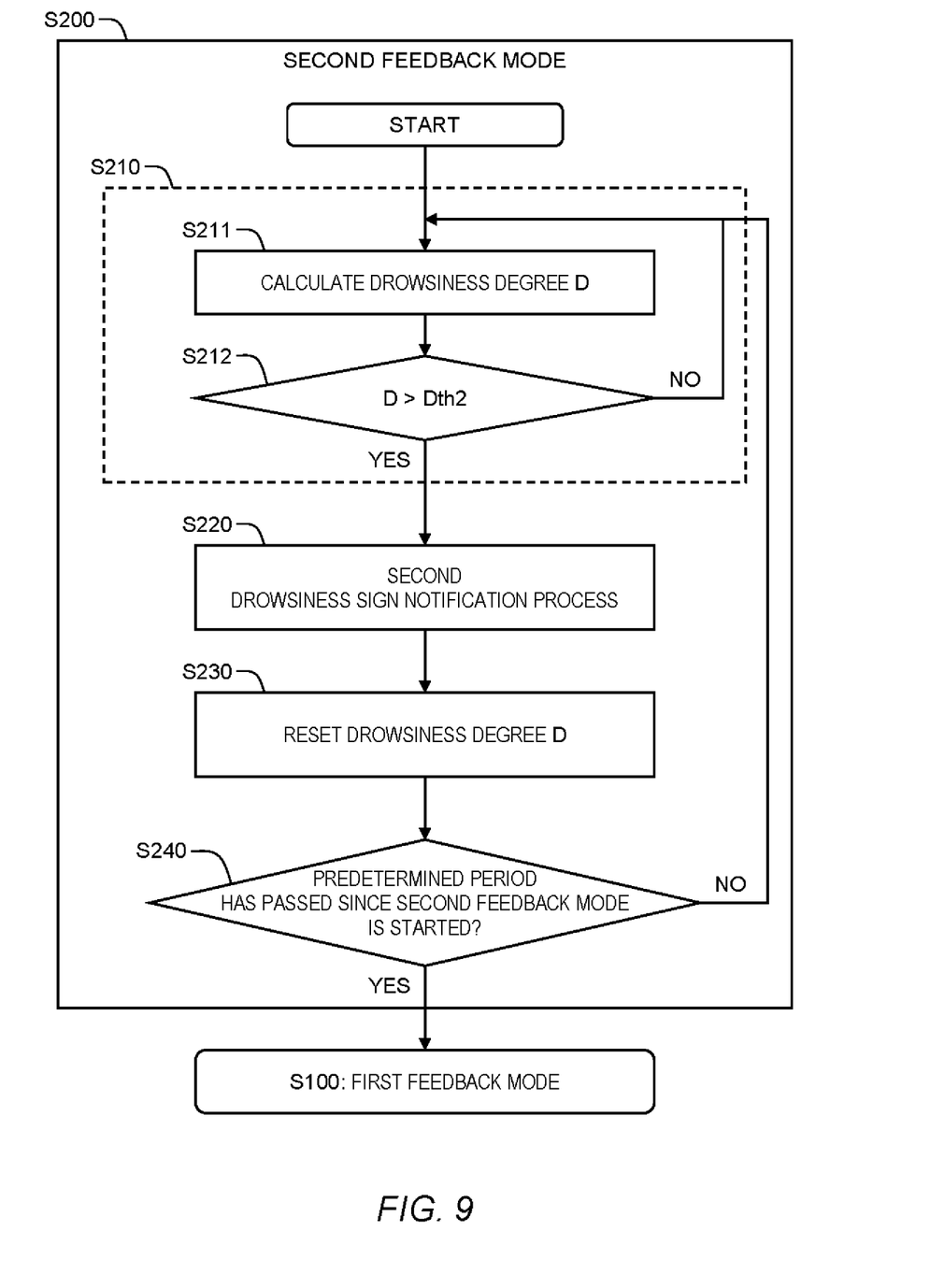
FIG. 9 is a flow chart showing in a summarized manner the processing in a second feedback mode by the drowsiness sign notification system according to an embodiment of the present disclosure.

FIG. 9 is a flow chart showing in a summarized manner the processing in the second feedback mode MFB2 according to the present embodiment. In Step S200, the control device 50 operates in the second feedback mode MFB2.

More specifically, in Step S210, the control device 50 executes the drowsiness sign determination process that determines whether or not the driver 5 shows a drowsiness sign based on the driver state information DRS. For example, the control device 50 calculates the drowsiness degree D of the driver 5 based on the driver state information DRS (Step S211). When the drowsiness degree D is equal to or less than the second threshold Dth2 (Step S212; No), the processing returns back to Step S211. When the drowsiness degree D exceeds the second threshold Dth2 (Step S212; Yes), the control device 50 determines that the driver 5 shows the drowsiness sign. Then, the processing proceeds to Step S220.

In Step S220, the control device 50 executes the second drowsiness sign notification process to give the second drowsiness sign notice FB2 to the driver 5.

In Step S230, the control device 50 resets the drowsiness degree D.

In Step S240, the control device 50 determines whether or not the predetermine period Ta has passed since the second feedback mode MFB2 is started. When the predetermine period Ta has not yet passed (Step S240; No), the processing returns back to Step S210. On the other hand, when the predetermine period Ta has passed (Step S240; Yes), the control device 50 switches the operation mode from the second feedback mode MFB2 to the first feedback mode MFB1. The processing returns back to Step S100.

4. Automated Driving System

The vehicle 1 according to the present embodiment may perform automated driving. Even during the automated driving, there is a case where it is important to keep the awake state of the driver 5. For example, when the driver 5 performs hands-off driving during the automated driving of Level-2, a degree of concentration on the driving may decrease. The degree of concentration of the driver is especially required in such scenes as traveling on an expressway, lane change, merging, being merged, overtaking, and the like. Moreover, in a case of the automated driving of Level-3, the driver 5 must return to manual driving in response to a demand from an automated driving system. Therefore, the drowsiness sign notification system 10 according to the present embodiment is useful even during the automated driving.

Figure 10:
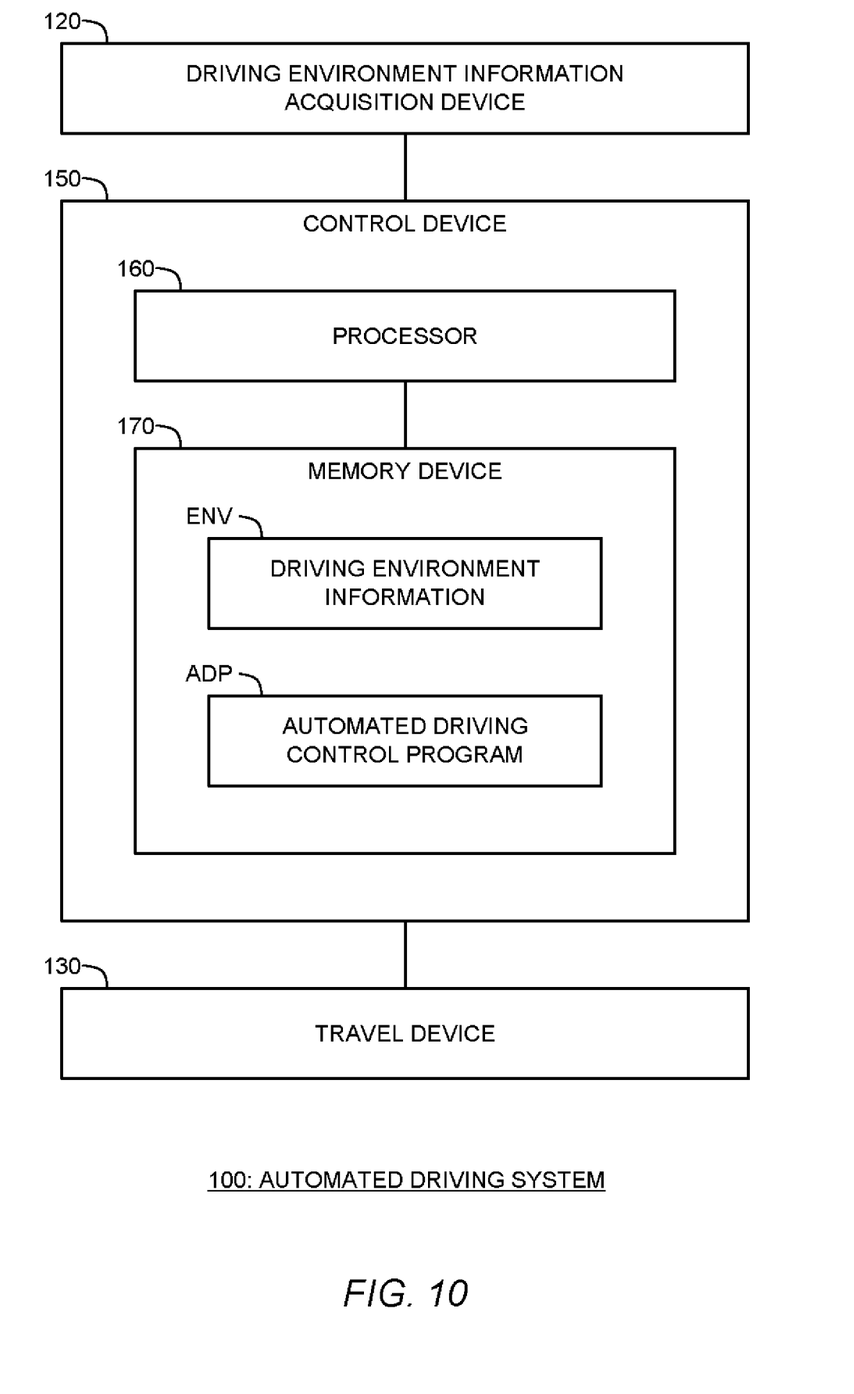
FIG. 10 is a block diagram showing a configuration example of an automated driving system according to an embodiment of the present disclosure.

FIG. 10 is a block diagram showing a configuration example of an automated driving system 100 according to the present embodiment. The automated driving system 100 includes a driving environment information acquisition device 120, a travel device 130, and a control device (controller) 150.

The driving environment information acquisition device 120 acquires driving environment information ENV indicating a driving environment for the vehicle 1. For example, the driving environment information ENV includes map information, vehicle position information, vehicle state information, surrounding situation information, and the like.

The map information includes a general navigation map. The map information may further indicate a lane configuration, a road shape, and the like. The driving environment information acquisition device 120 acquires necessary map information from a map database.

The vehicle position information indicates a position and an orientation of the vehicle 1 on a map. The driving environment information acquisition device 120 acquires the vehicle position information by the use of a GPS (Global Positioning System) sensor. The driving environment information acquisition device 120 may acquire more accurate vehicle position information by performing a well-known localization.

The vehicle state information indicates a vehicle state such as a speed (vehicle speed), a steering angle, a lateral acceleration, and the like of the vehicle 1. The driving environment information acquisition device 120 acquires the vehicle state information by the use of sensors installed on the vehicle 1.

The surrounding situation information indicates a situation around the vehicle 1. The driving environment information acquisition device 120 acquires the surrounding situation information by the use of a recognition sensor installed on the vehicle 1. Examples of the recognition sensor includes a camera, a radar, a LIDAR (Laser Imaging Detection and Ranging), and the like.

The travel device 130 includes a steering device, a driving device, and a braking device. The steering device turns wheels of the vehicle 1. For example, the steering device includes an electric power steering (EPS) device. The driving device is a power source that generates a driving force. Examples of the drive device include an engine, an electric motor, an in-wheel motor, and the like. The braking device generates a braking force.

The control device (controller) 150 is a computer that executes a variety of information processing. The control device 150 includes a processor 160 and a memory device 170. The processor 160 executes a variety of information processing. For example, the processor 160 includes a CPU. The memory device 170 stores a variety of information. For example, the driving environment information ENV descried above is stored in the memory device 170. Examples of the memory device 170 include a volatile memory, a nonvolatile memory, and the like.

The control device 150 executes "automated driving control" that controls the automated driving of the vehicle 1. For example, the control device 150 determines a target route to a destination based on the map information and the vehicle position information. The determined target route is managed together with the map information.

Moreover, the control device 150 generates a travel plan of the vehicle 1 during the automated driving based on the driving environment information ENV. Examples of the travel plan include keeping a current travel lane, making a lane change, and the like. Furthermore, the control device 150 generates a target trajectory required for the vehicle 1 to travel in accordance with the travel plan. Then, the control device 150 executes vehicle travel control by controlling the travel device 130 such that the vehicle 1 follows the target trajectory.

An automated driving control program ADP is a computer program executed by a computer. The automated driving control by the processor 160 (i.e., the control device 150) is achieved by the processor 160 executing the automated driving control program ADP. The automated driving control program ADP is stored in the memory device 170. The automated driving control program ADP may be recorded on a computer-readable recording medium. The automated driving control program ADP may be provided via a network.

It should be noted that the control device 150 may be an ECU installed on the vehicle 1, or may be an information processing device outside the vehicle 1. In the latter case, the control device 150 communicates with the vehicle 1 to remotely execute the automated driving control.

The drowsiness sign notification system 10 according to the present embodiment may be included in the automated driving system 100. The control device 50 of the drowsiness sign notification system 10 may be included in the control device 150, or may be separated from the control device 150. The drowsiness sign notification program FBP of the drowsiness sign notification system 10 may be included in the automated driving control program ADP, or may be separated from the automated driving control program ADP.

What is claimed is:

1. A drowsiness sign notification system applied to a vehicle,
the drowsiness sign notification system comprising:
a driver monitor configured to detect a driver state being a state of a driver of the vehicle; and a controller programmed to execute:
  a drowsiness sign determination process that determines whether or not the driver shows a drowsiness sign based on the driver state, wherein the drowsiness sign determination process periodically determines a drowsiness level of the driver, assigns drowsiness points based on the determined drowsiness level, and maintains a drowsiness degree based on an integrated value of prior assigned drowsiness points;
  a first drowsiness sign notification process that gives a first drowsiness sign notice to the driver through display or vibration without using audio, when it is determined that the driver shows the drowsiness sign, wherein the driver is determined to show the drowsiness sign if the drowsiness degree exceeds a predetermined maximum value; and
  a second drowsiness sign notification process that gives a second drowsiness sign notice to the driver through audio, when it is determined again that the driver shows the drowsiness sign after the first drowsiness sign notification process.

2. The drowsiness sign notification system according to claim 1, wherein
  in the drowsiness sign determination process, the controller is further configured to:
    calculate a drowsiness degree of the driver based on the driver state; and
    when the drowsiness degree exceeds a threshold, determine that the driver shows the drowsiness sign.

3. The drowsiness sign notification system according to claim 2, wherein
  when the drowsiness degree exceeds a first threshold, the controller executes the first drowsiness sign notification process and resets the drowsiness degree, and
  when the drowsiness degree exceeds a second threshold after the first drowsiness sign notification process, the controller executes the second drowsiness sign notification process.

4. The drowsiness sign notification system according to claim 3, wherein
  the controller executes the second drowsiness sign notification process and resets the drowsiness degree, and
  when the drowsiness degree exceeds the second threshold again after the second drowsiness sign notification process, the controller executes the second drowsiness sign notification process again.

5. The drowsiness sign notification system according to claim 3, wherein
  the second threshold is equal to or lower than the first threshold.

6. The drowsiness sign notification system according to claim 1, wherein
  operation modes of the controller include a first feedback mode and a second feedback mode,
  in the first feedback mode, the controller executes the drowsiness sign determination process and the first drowsiness sign notification process,
  after executing the first drowsiness sign notification process, the controller switches an operation mode from the first feedback mode to the second feedback mode, and
  in the second feedback mode, the controller executes the drowsiness sign determination process and the second drowsiness sign notification process.

7. The drowsiness sign notification system according to claim 6, wherein
  after an elapse of a predetermine period since the operation mode is switched from the first feedback mode to the second feedback mode, the controller switches the operation mode from the second feedback mode to the first feedback mode.

8. The drowsiness sign notification system according to claim 1, wherein
  the second drowsiness sign notification process includes a dialogue process that conducts a dialogue with the driver through the audio.

9. A drowsiness sign notification method applied to a vehicle having a driver monitor that detects a driver state being a state of a driver of the vehicle, the drowsiness sign notification method comprising:
  a drowsiness sign determination process that determines whether or not the driver
  shows a drowsiness sign based on the driver state, wherein the drowsiness sign determination process periodically determines a drowsiness level of the driver, assigns drowsiness points based on the determined drowsiness level, and maintains a drowsiness degree based on an integrated value of prior assigned drowsiness points;
  a first drowsiness sign notification process that gives a first drowsiness sign notice to the driver through display or vibration without using audio, when it is determined that the driver shows the drowsiness sign, wherein the driver is determined to show the drowsiness sign if the drowsiness degree exceeds a predetermined maximum value; and
  a second drowsiness sign notification process that gives a second drowsiness sign notice to the driver through audio, when it is determined again that the driver shows the drowsiness sign after the first drowsiness sign notification process.

10. A drowsiness sign notification program applied to a vehicle having a driver monitor that detects a driver state being a state of a driver of the vehicle, the drowsiness sign notification program being configured to, when executed by a computer, cause the computer to execute:
  a drowsiness sign determination process that determines whether or not the driver shows a drowsiness sign based on the driver state, wherein the drowsiness sign determination process periodically determines a drowsiness level of the driver, assigns drowsiness points based on the determined drowsiness level, and maintains a drowsiness degree based on an integrated value of prior assigned drowsiness points;
  a first drowsiness sign notification process that gives a first drowsiness sign notice to the driver through display or vibration without using audio, when it is determined that the driver shows the drowsiness sign, wherein the driver is determined to show the drowsiness sign if the drowsiness degree exceeds a predetermined maximum value; and
  a second drowsiness sign notification process that gives a second drowsiness sign notice to the driver through audio, when it is determined again that the driver shows the drowsiness sign after the first drowsiness sign notification process.

* * * * *